United States Patent [19]
Seffernick

[11] Patent Number: 5,894,301
[45] Date of Patent: Apr. 13, 1999

[54] COLLAR MOUNTED POINTING STICK

[75] Inventor: Lewis L. Seffernick, Decatur, Ind.

[73] Assignee: CTS Corporation, Elkhart, Ind.

[21] Appl. No.: 08/717,517

[22] Filed: Sep. 23, 1996

[51] Int. Cl.[6] .................................................. G09G 5/08
[52] U.S. Cl. ........................................ 345/160; 345/161
[58] Field of Search .................................. 345/156, 157, 345/160, 161, 168, 169; 341/34

[56] References Cited

U.S. PATENT DOCUMENTS

| | | |
|---|---|---|
| Re. 35,016 | 8/1995 | Gullman et al. . |
| 4,680,577 | 7/1987 | Straayer et al. . |
| 4,876,524 | 10/1989 | Jenkins . |
| 5,407,285 | 4/1995 | Franz . |
| 5,473,347 | 12/1995 | Collas et al. . |
| 5,489,900 | 2/1996 | Cali et al. . |
| 5,521,596 | 5/1996 | Selker et al. . |
| 5,594,618 | 1/1997 | Sellers ................................. 345/168 |
| 5,712,660 | 1/1998 | Martin ................................. 345/161 |

*Primary Examiner*—Jeffery Brier
*Attorney, Agent, or Firm*—Michael W. Starkweather

[57] ABSTRACT

A pointing device for controlling the positioning, movement and operation of a cursor on the display screen. Specifically, there is a pointing stick assembly using resistive material strain gages mounted on the sides of a shaft or stick for sensing when the stick is experiencing stresses and strains therein because of an applied force to the stick. The pointing stick has a stick supporting collar securely attached to a substrate. The collar extends from the substrate to approximately around the location of the strain gages. The collar may have a beveled surface located between opposing surfaces of the collar and shaft.

12 Claims, 2 Drawing Sheets

COLLAR MOUNTED POINTING STICK

BACKGROUND OF THE PREFERRED EMBODIMENT(S)

1. Field of the Preferred Embodiments(s)

This invention generally relates to a pointing device for controlling the positioning, movement and operation of a cursor on a display screen. Specifically, there is a collar mounted pointing stick with a resistor based strain gages mounted thereon.

2. Description of the Related Art

Various devices are well known for controlling cursor movement over a computer display screen of a computer and for signaling a choice of computer command identified by the position of the cursor on the display screen menu. One such device is a "mouse" which has a ball on its underside rolled over a horizontal surface, with the x- and y-axis components of movement being sensed and transmitted through a connecting cable to a serial input port of the computer. The signal to the computer is varied by the amount and direction of movement of the mouse ball, and causes the cursor on the display screen to have a corresponding movement. Two "mouse" or "click" buttons located on the top of the mouse at the forward end permit the computer operator to enter a selection or other command to the computer (the command typically being shown by the position of the cursor on a displayed menu) upon pressing one or the other or both buttons, depending upon the software associated with the device. Such a device, which is separate from the computer console and keyboard and requires a connection to a computer port, requires a flat, horizontal surface, and for operation of the mouse, the computer operator must completely remove one hand from the computer keyboard.

Another cursor controlling the signaling mechanism is a "joystick" which like the mouse is completely separated from the computer console and keyboard. The joystick is typically an elongated stick that extends upwardly from a base connected to the computer console by means of a cable. The joystick is operated by tilting the upstanding stick in various directions to cause the cursor or other display element to move in a direction and usually at a speed corresponding to the direction and pressure exerted on the stick by the computer operator. The operation of a joystick, however, frequently requires that both hands be removed from the computer keyboard, one hand to hold the base while the other manipulates the joystick. A "click" button is usually located on the joystick. Although a mouse or a joystick can be used with a portable "laptop" or "notebook" size computers, such devices are cumbersome, must be carried separately and connected to the computer before use, and are not suitable for operation during travel.

Another type of cursor controlling device is a "trackball." This device, which in essence is an inverted mouse, includes a rotatable ball mounted within a housing. The ball is rotated by a finger, thumb or palm of the computer operator, and the x- and y-components of movement are sensed and input into the computer to cause corresponding movement of the cursor across the display screen. "Mouse" or "click" buttons are usually located on the trackball housing, although with some models the selection signal is input by pressing the "enter" key on the standard keyboard. This type of pointing device has been found useful with portable computers because it can be temporarily affixed to one side of the computer case for manipulation by one hand of the computer operator. However, though trackball devices can be removably attached to the computer case, they still require attachment before use and removal after use and they do not have an ergonomically positioned set of "click" buttons.

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. That manufacturer also provided two upwardly extending "mouse" or "click" buttons immediately below the space bar.

Despite the advantages of each type of cursor control, none have been easily adapted to personal digital assistants (PDAs), palmtop computers, and the like. Specifically, current pointing stick designs are too tall to apply to PDAs. Uniquely, one major current manufacturing technology requires strain gages to be located on the pointing stick. Strain gages are devices that sense the amount and location of applied pressure placed upon the pointing stick. The sensed pressure creates electrical output signals used to direct the cursor on a display device. The maximum amount of created strain on the pointing stick is at the base of the pointing stick where it attaches to the supporting substrate. Thus, the ideal location for a strain gage is at the maximum strain point - at the base of the stick. However, current manufacturing capabilities place strain gages a required distance above the previously attached substrate surface. Therefore, the minimum height of the stick is fixed so that enough strain can be created at the location of the elevated strain gages for proper operation. This minimum height far exceeds the height maximum for application of a pointing stick onto a PDA keyboard. Based on this strain gage minimum height location criteria, the pointing stick cannot be shortened more than present designs for proper operation. Therefore, there is a need for a pointing stick, which uses side mounted strain gages, that is short enough to fit into a PDA keyboard.

3. Description of Related Art

Examples of patents related to the present invention are as follows, and each patent is herein incorporated by reference for the supporting teachings:

U.S. Pat. No. Re. 35,016, is a three-axis force measurement stylus.

U.S. Pat. No. 5,489,900, is a strain sensitive columnar transducer for a data entry keyboard contains a column upstanding from the keyboard.

U.S. Pat. No. 5,473,347, is a computer pointing device for controlling the positioning, movement and operation of a cursor on the display screen of a computer.

U.S. Pat. No. 5,407,285, is an apparatus for use in a computer keyboard for cursor control is disclosed.

U.S. Pat. No. 5,521,596, is a sensor device placed either underneath a key cap or a key on a keyboard or between two keys on a keyboard so that cursor movement may be carried out from the keyboard itself.

U.S. Pat. No. 4,876,524, is an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

U.S. Pat. No. 4,680,577, is a multipurpose key switch for controlling cursor movement on a CRT display and for character entry includes a key cap that moves laterally to provide cursor control and that moves vertically for character entry.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF THE PREFERRED EMBODIMENT(S)

It is a feature of the invention to provide a pointing and signaling device for controlling the positioning, movement and operation of a cursor on the display screen.

A further feature of the invention is to provide a pointing stick assembly using resistor based strain gages mounted on the sides of a shaft or stick for sensing when the stick is being bent and thus creating strain therein.

Yet, a further feature of the invention is to provide a device that has a stick supporting collar securely and permanently attached to a substrate. The collar extends from the substrate to approximately around the location of the strain gages.

Additionally, another feature of the invention may be to provide the collar with a beveled area located between opposing surfaces of the collar and shaft for easy assembly and clearance for solder fillets.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter and which will form the subject matter of the appended claims. Those skilled in the art will appreciate that the preferred embodiment may readily be used as a basis for the designing of other structures, methods and systems for carrying out the several purposes of the present invention. It is important, therefore, that the claims are regarded as including such equivalent constructions since they do not depart from the spirit and scope of the present invention.

Further, the purpose of the abstract is to enable the U.S. Patent and Trademark Office and the public generally, and especially the scientists, engineers and practitioners in the art who are not familiar with patent or legal terms or phraseology, to find out quickly from a cursory inspection the nature and essence of the technical disclosure of the application. The abstract is neither intended to define the invention of the application, which is measured by the claims, neither is it intended to be limiting as to the scope of the invention in any way.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

Charter by the U.S. Constitution

This disclosure of the invention is submitted in furtherance of the constitutional purposes of the United States Patent Laws "to promote the progress of science and useful arts," as stated in Article 1, Section 8 of the United States Constitution.

DETAILED DESCRIPTION OF THE PREFERRED EMBODIMENT

Figure 1:
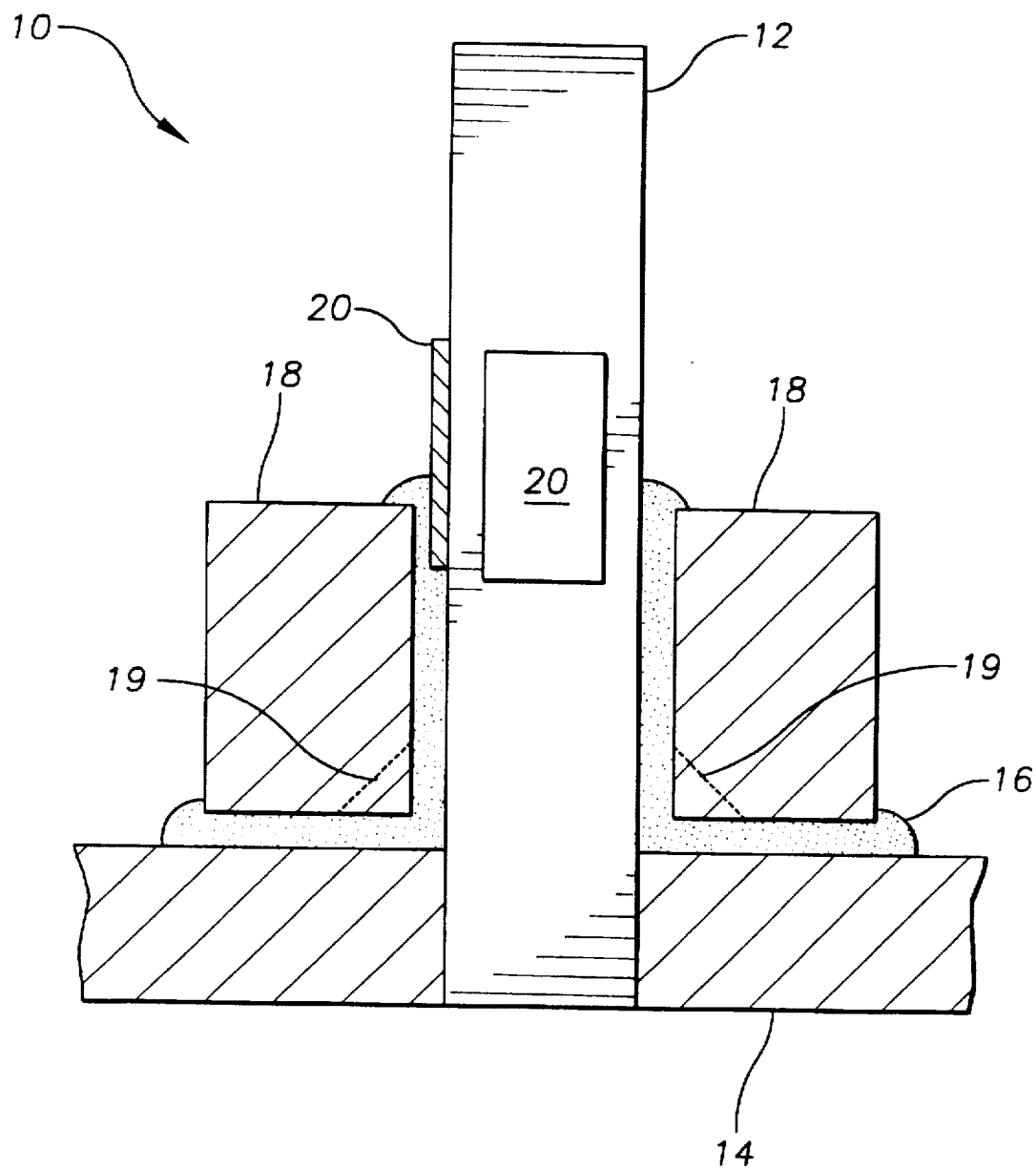
FIG. 1 is a sectional side view of the collar mounted pointing stick.
Figure 2:
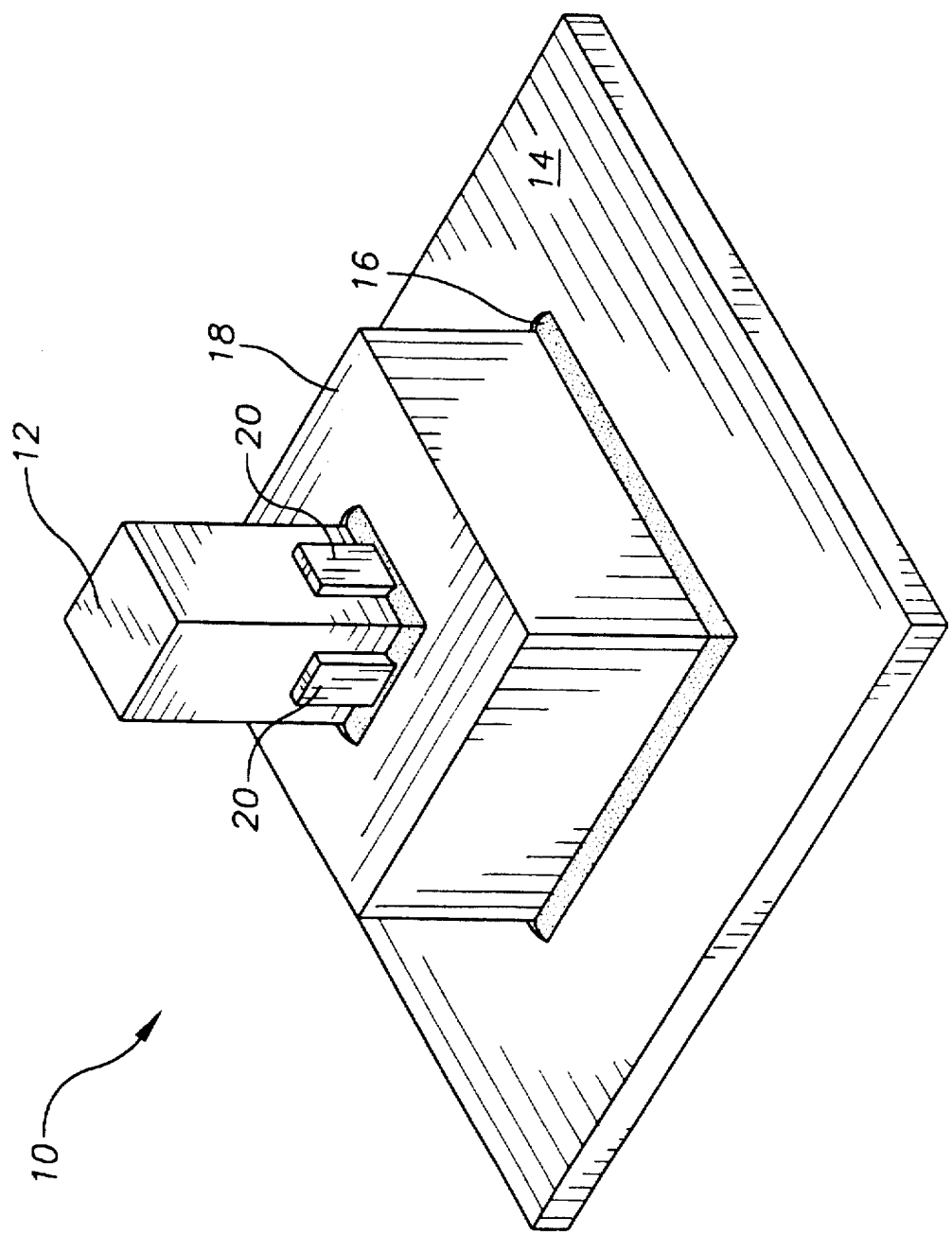
FIG. 2 is a respective view of FIG. 1.

Referring to both FIGS. 1 and 2, there is a pointing stick 10 that can be used to control the movement of a curser on a computer screen. In particular, the pointing stick 10 is comprised of a stick 12 (or shaft), a substrate 14 for supporting the stick, a bonding compound 16 like epoxy, a collar 18, and at least two strain gages 20. It is noted that the pointing stick will have the strain gages coupled to electrical conductors or wires (not shown) for sending signals, which are generated in response to sensed strain, to an analysis circuit (not shown). In an alternate embodiment, the collar 18 has a beveled surface 19 located on the bottom side of the inner surface abutting to the stick 12.

Generally, the stick 12 is perpendicular to the substrate and is attached to the substrate via bonding material 16. Moreover, the strain gages are made of thick film piezoresistive material, which are applied using known screen techniques.

It is noted that FIG. 2 illustrates the alternate embodiment where there is no gap between adjoining surfaces between the collar 18 and stick 12. As a result, bonding material 16 will not be located therebetween. Additionally, the strain gages 20 might not extend below the top surface of the collar 18.

The pointing stick 10 is assembled as follows: The first step usually involves either the screening of resistive thick film or the sputtering of resistive thin film material on to the stick 12 sides. The screened on material forms the strain gages 20. The second step often involves the placement of the stick 12 into the substrate 14 (or base). Thereafter, usually wires are attached to connect the strain gages 20 to circuitry (not shown) mounted on the substrate 14. At this stage, a certain amount of bonding material 16 is applied onto the substrate to secure the collar 18 to the substrate 14 and stick 12. Next, the strain concentrator collar 18 is placed around the stick 12. Finally, the whole assembly is cured to harden the bonding material.

Remarks About the Preferred Embodiment

One of ordinary skill in the arts of strain gages and ceramic materials, and more particularly the art of designing pointing sticks with strain gages on the sides, will realize many advantages from using the preferred embodiment. For example, the collar 18 will shift the region of highest strain from the base to the top of the collar 18 so that the maximum strain falls on the strain gauges 20. Additionally, by providing a beveled surface 19 it would be easier to place collars 18 over stick 12 and there is a cavity used as a fillet for the bonding material.

Another advantage of using the preferred embodiment is that the complete length of the stick 12 can now be shortened. Specifically, when the stick 12 is shortened there is a decrease in the amount of strain generated along the stick 12 because of a person pushing the pointing stick 10 with a finger. However, the collar 18 has effectively moved the base of the stick 12, which is the location of the highest strain, to the location of the strain gages 20. Thus, the strain gages 20 are now capable of sensing enough strain to be able to generate detectable and understandable electrical signals representative of the applied strain. Moreover, with the shortened length it is now possible to use the preferred embodiment into a PDA.

Variations of the Preferred Embodiment(s)

One of ordinary skill in the art of making pointing stick will realize that there are many different ways of accomplishing the preferred embodiment. For example, although it is contemplated to make the pointing stick 12, substrate 14, and collar 18 out of ceramic material, where any suitable material would work, like plastics, epoxy resin, or metals etc. Additionally, although bonding compound 16 is illustrated to be placed between the collar 18 and the stick 12, it may not be required when the collar 18 is securely snug around the stick 12. It is also illustrated that the collar 18 has straight internal walls, however it would be beneficial to provide a beveled surface 19 on the lower portion of the walls for increasing the ease of placing the collar over the stick during manufacturing and for providing a fillet. Of course, any shape could be used for a fillet or beveled area.

It is further illustrated that the outer surface of the collar 18 has a square shape, where any shape would work, like round or oval. Moreover, although the collar 18 is illustrated to extend up to and over the location of the strain gages 20, it may not be required to be this way. It is possible to have the collar 18 equal to or shorter than the lower edge of the strain gages 20.

Eventhough the specification has considered the collar and base to be two separate pieces, it is considered equivalent to have a single combined one piece base and collar construction.

Another variation of the preferred embodiment including the collar 18 is to use a shorter stick 12 and mount the stick onto the substrate 14 and not position the stick 12 into the substrate 14. Of course, if this is the method of choice then bonding material would have to be used under the stick 12 to secure it to the substrate 14. Often this shorter stick operation includes some curing process for hardening the bonding material 16 between the stick and substrate. If the stick is placed onto the substrate 14, the bonding material 16 only uses an area large enough for attaching the base of the stick 12.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by united states patent is:

1. A device for generating electrical signals responsive to a users actuation thereof, comprising:
a) a shaft, having a first and second end;
b) a base having the first end of the shaft mounted therein;
c) a sensor, mounted on the shaft and located a distance from the first end, for sensing the amount of strain in the shaft originating from an applied force to the shaft; and
d) a collar mounted around the shaft and onto the base for concentrating the strain on the shaft at the location of the sensor, wherein the collar extends from the base to a first distance that generally ends in a region that will cover a first part of the sensor and keep a second part of the sensor from being covered by the collar for concentrating the shaft strain at the sensor to generate signals representative of the forces applied to the shaft by the user.

2. The device of claim 1, further comprising:
a bonding material located between opposing surfaces on the shaft, the base, and the collar.

3. The device of claim 1, wherein the collar has a beveled surface located between opposing surfaces of the collar and shaft.

4. The device of claim 1, wherein the shaft and collar have contiguous surfaces.

5. A device for allowing a user to control an electrical responsive device, comprising:
a) a shaft, having a first and second end;
b) a base having the shaft mounted thereon;
c) sensing means, mounted on the shaft and located a distance from the base, for sensing the amount of strain exerted on the shaft;
d) a collar mounted around the shaft and onto the base for concentrating the strain on the shaft at the location of the sensing means; and
e) wherein the shaft is fixed relative to the collar and the collar extends from the base to a first distance that generally ends in a region that will cover a first part of the sensor and keep a second part of the sensor from being covered by the collar for concentrating the shaft strain at the sensor to generate signals representative of the forces applied to the shaft by the user.

6. The device of claim 1, wherein the shaft and collar have a portion of contiguous surfaces.

7. The device according to claim 5, wherein the collar has a beveled surface located between opposing surfaces of the collar and shaft.

8. The device according to claim 5, wherein the shaft extends through the base.

9. A device for generating electrical signals responsive to forces applied thereon, comprising:
a) a shaft, having a sensor mounted thereon and located in a region away from an end of the shaft, for sensing an amount of strain in the shaft from the force applied thereto;
b) a base having the shaft mounted thereto; and
c) a collar, mounted around the shaft and onto the base, for concentrating the strain on the shaft at the location of the sensor, wherein the collar extends from the base to a first distance that generally ends in a region that will cover a first Part of the sensor and keep a second part of the sensor from being covered by the collar for concentrating the shaft strain at the sensor to generate signals representative of the forces applied to the shaft by the user.

10. The device according to claim 9, wherein the shaft extends through the base.

11. The device according to claim 9, wherein the shaft is permanently fixed relative to the collar.

12. The device according to claim 9, wherein the collar has a beveled surface located between opposing surfaces of the collar and shaft.

* * * * *